Patented Jan. 29, 1929.

1,700,546

UNITED STATES PATENT OFFICE.

ERWIN SCHWENK, OF AUSSIG, CZECHOSLOVAKIA.

PROCESS FOR THE MANUFACTURE AND PRODUCTION OF 2-HYDROXY-3-CARBOXY NAPHTHALENE AND ITS METALLIC SALTS.

No Drawing. Application filed June 1, 1927, Serial No. 195,867, and in Germany April 2, 1927.

It is known that the manufacture of 2 hydroxy 3 carboxy naphthalene

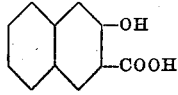

by the action of carbon dioxide on sodium β naphtholate

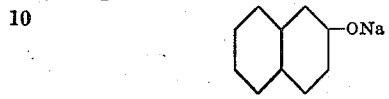

at temperature of 200–260° C. necessitates the employment of a very high pressure of carbon dioxide in order to obtain yields which are satisfactory in practice. Consequently in order to carry out this process it is necessary to employ high pressure apparatus which requires careful watching and involves high maintenance costs.

It is also known that 2 hydroxy 1 carboxy naphthalene

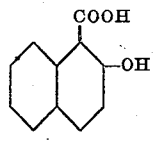

as distinguished from 2 hydroxy 3 carboxy naphthalene can be obtained from salts of β naphthol

with good yields by the action of carbon dioxide at a relatively lower temperature and a lower pressure of carbon dioxide.

It has now been found that salts of 2 hydroxy 3 carboxy naphthalene can be obtained in a simple manner by heating the alkali metal salts of 2 hydroxy 1 carboxy naphthalene to a temperature above 200° C.

Preferably the salt of 2 hydroxy 1 carboxy naphthalene is formed during the course of the process intended for the production of the 2 hydroxy 3 carboxy naphthalene. To this end, for example, a salt of β naphthol, is treated with carbon dioxide at a suitable temperature and moderate pressure and the metallic salts of 2 hydroxy 1 carboxy naphthalene formed are then heated, preferably in the same reaction vessel, without the addition of further carbon dioxide to a temperature above 200° C.

The following are examples of the manner in which the process may be carried into effect.

*Example I.*

144 kg. of β naphthol with 1 molecule (i. e. 40 kg.) of caustic soda are dissolved in the least possible amount of water necessary for solution and evaporated to dryness in vacuo in an autoclave which is best arranged so as to be suitable for the later treatment with carbon dioxide. After the evaporation of the water the material is heated in vacuo at a temperature of about 160° C. to complete dryness, so that the last traces of water are driven off. The finely powdered sodium β naphtholate obtained in this manner is then treated at a temperature of about 40–60° C. with dry carbon dioxide, whereby the pressure is increased to about 10 atmospheres. The carbon dioxide is quickly absorbed. When the absorption of carbon dioxide ceases, the pressure is released by opening a valve and the temperature is slowly raised to about 260° C. The conversion of the sodium salt of 2 hydroxy 1 carboxy naphthalene, which is first formed, into the sodium salt of 2 hydroxy 3 carboxy naphthalene then takes place. After heating for about 6 hours, during which the pressure is increased to about 4 atmospheres, the heat is cut off and, after cooling, the contents of the vessel are dissolved in water. The aqueous solution of the sodium salt of 2 hydroxy 3 carboxy naphthalene thus obtained is worked up in known manner to free 2 hydroxy 3 carboxy naphthalene, a yield of about 90 per cent being obtained. Instead of the sodium salt, other salts, for example, the potassium salt, could also be employed.

*Example II.*

210 kg. of the sodium salt of 2 hydroxy 1 carboxy naphthalene, which can easily be obtained by neutralizing the 2 hydroxy 1 carboxy naphthalene with sodium carbonate or by mixing an alcoholic solution of the same with an alcoholic sodium hydroxide solution and crystallizing, are freed from the water or alcohol of crystallization which they contain by heating in vacuo. After being thoroughly dried to form a fine powder the sodium salt of 2 hydroxy 1 carboxy naphthalene is converted into the sodium salt of 2 hydroxy 3 carboxy naphthalene by slow heating at 260° C., in some cases without releasing the vacuum, during which the pressure in this case also increases to about 4 atmospheres, or somewhat lower if the vacuum was not previously released. After this the process is continued further as in the first example. The yield is about 90 per cent. In this case also other salts of 2 hydroxy 1 carboxy naphthalene, for example, the potassium salt, can also be employed.

The temperatures specified and the time of the various steps depend to a certain extent on the nature and size of the apparatus and may vary to some extent.

I claim:—

1. Process for the manufacture and production of alkali metal salts of 2 hydroxy 3 carboxy naphthalene which comprises heating an alkali metal salt of 2 hydroxy 1 carboxy naphthalene to a temperature above 200° C.

2. Process for the manufacture and production of 2 hydroxy 3 carboxy naphthalene which comprises heating an alkali metal salt of 2 hydroxy 1 carboxy naphthalene to a temperature above 200° C. and treating the alkali metal salt of 2 hydroxy 3 carboxy naphthalene thereby obtained to form 2 hydroxy 3 carboxy naphthalene.

3. Process in accordance with claim 1 in which the alkali metal salt of 2 hydroxy 1 carboxy naphthalene is formed by the action of carbon dioxide on an alkali metal salt of β naphthol, during the course of the process for the production of alkali metal salts of 2 hydroxy 3 carboxy naphthalene, so that the process is continuous.

4. Process in accordance with claim 2 in which the alkali metal salt of 2 hydroxy 1 carboxy naphthalene is formed by the action of carbon dioxide on an alkali metal salt of β naphthol, during the course of the process for the production of 2 hydroxy 3 carboxy naphthalene, so that the process is continuous.

5. Process in accordance with claim 1 in which the sodium salt of 2-hydroxy-1-carboxy naphthalene is formed by the action of carbon dioxide on sodium β-naphtholate during the course of the process for the production of the sodium salt of 2-hydroxy-3-carboxy naphthalene, so that the process is continuous.

6. Process in accordance with claim 2 in which the sodium salt of 2-hydroxy-1-carboxy naphthalene is formed by the action of carbon dioxide on sodium β-naphtholate during the course of the process for the production of 2-hydroxy-3-carboxy naphthalene so that the process is continuous.

ERWIN SCHWENK.